Patented Aug. 7, 1945

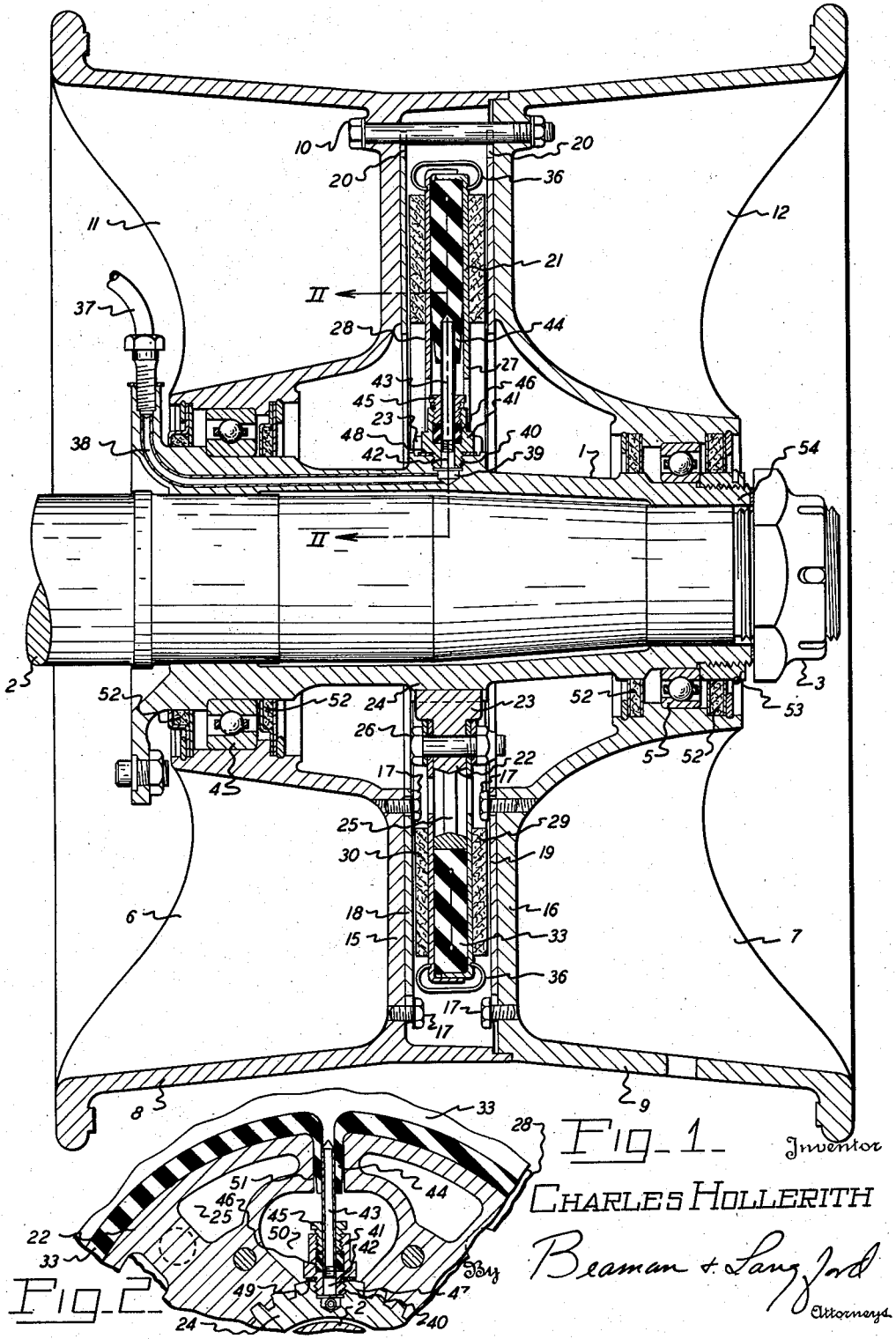

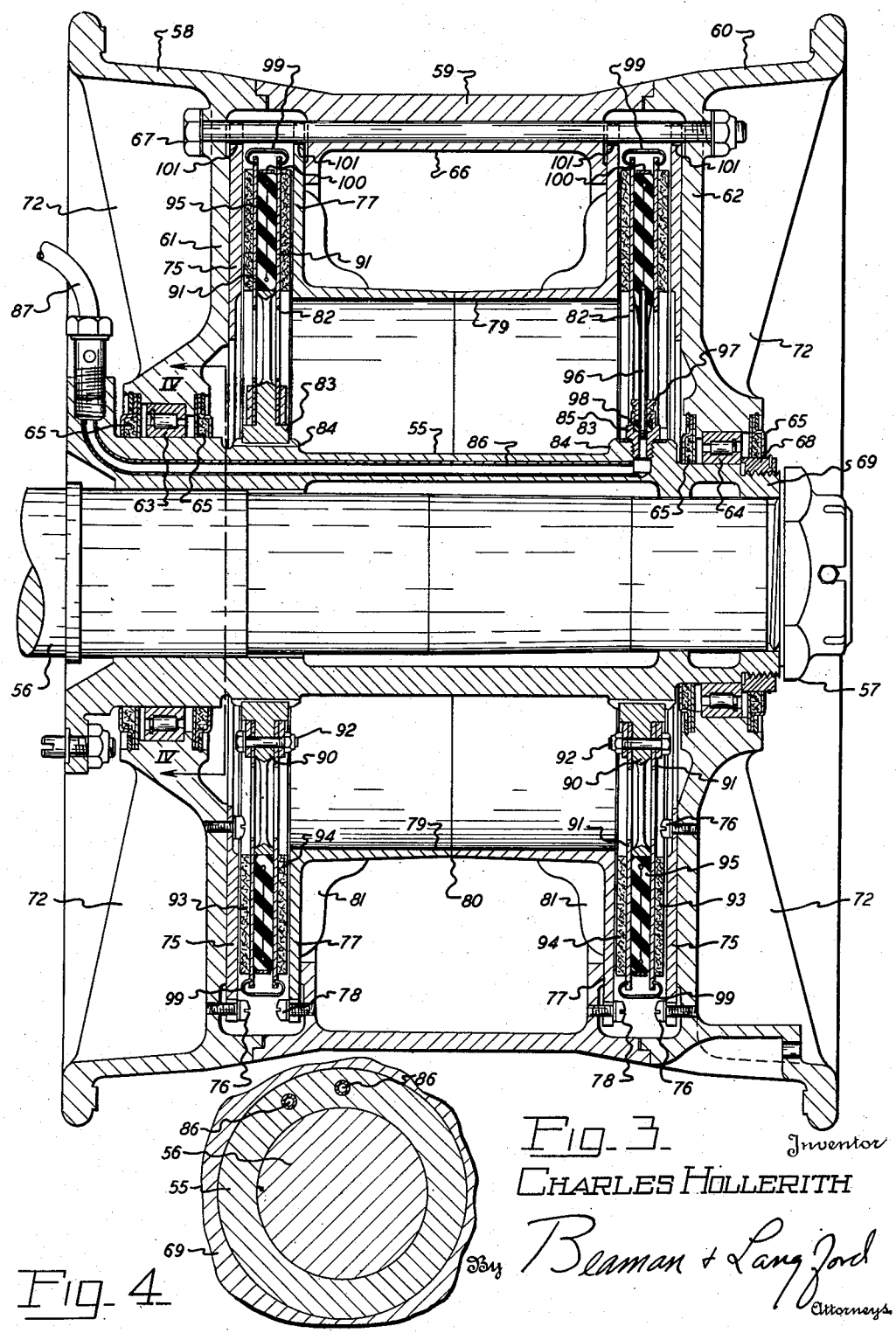

2,381,166

UNITED STATES PATENT OFFICE 2,381,166

WHEEL BRAKE

Charles Hollerith, Jackson, Mich., assignor to Hayes Industries, Inc., Jackson, Mich., a corporation of Michigan Application January 29, 1942, Serial No. 428,643

13 Claims. (Cl. 188—152)

The present invention relates to wheels and more particularly to wheels peculiarly adaptable for use on aircraft and provided in combination with brakes.

Wheels of the character to which the present invention are applied are generally known. The present invention relates to details of construction which constitute the means whereby wheels of the character described are lighter in weight, more efficient and of longer life than wheels of the prior art.

An object of the invention is to provide a wheel of the character described having a brake element splined to the hub thereof.

Another object of the invention is to provide a part of the brake structure of a material of a different coefficient of expansion than the balance of the wheel for the purpose of restricting expansion strain due to the heating up of the brake in operation.

A further object of the invention is to provide a multisection wheel body with means for securing the sections together and associating the means with the brake friction members for preventing relative movement of the brake friction members with respect to the wheel body.

These and other objects residing in the arrangement, construction and combination of the parts will be apparent from the following specification when taken with the accompanying drawings in which:

Figure 1 is a vertical section of one form of the invention,

Fig. 2 is a section on the line II—II of Fig. 1,

Fig. 3 is a vertical section of another form of the invention, and

Fig. 4 is a section on the line IV—IV of Fig. 3, but reduced in size.

Referring particularly to the drawings, the reference character 1 indicates a wheel hub supported by an axle 2, and held on the axle by a nut 3. The hub supports through bearings 4 and 5, respectively, wheel sections 6 and 7. The section 6 has a rim portion 8 and the section 7 has a rim portion 9. The rim portions 8 and 9 are butted together and the wheel sections 6 and 7, together with the rim sections 8 and 9, are held together by a plurality of circumferentially spaced bolts 10. The wheel portions 6 and 7 are provided with a plurality of radiating circumferentially spaced reinforcing webs 11 and 12.

The wheel portions 6 and 7 have integral annular, radially extending plate portions 15 and 16, to which are secured by screws 17, respectively, annular, radially extending friction plates 18 and 19. The plates 18 and 19 as shown particularly adjacent the top of Fig. 1 are provided with a series of circumferentially spaced, peripheral U-shaped recesses 20 through which the bolts 10 extend, the bolts 10 constituting drivers for the friction plates 18 and 19 to prevent relative rotational movement of the friction plates 18 and 19 when the brakes are applied.

Extending between the friction plates 18 and 19 is a brake member 21. The brake member 21 is constituted by a structure radially extending from the hub 1, with which a driving connection is provided by a ring 22 having an annular shoulder 23 splined to an annular boss 24 on the hub 1.

The ring 22 is provided with a plurality of circumferentially spaced weight reducing openings 25, and has clamped to the opposite sides thereof by a plurality of circumferentially spaced bolts 26, a pair of radially extending annular plates 27 and 28. The plates 27 and 28 extend between the friction plates 18 and 19 and have suitably connected thereto brake linings or shoes 29 and 30, respectively. The linings 29 and 30, respectively, are disposed adjacent the friction plates 19 and 18 for operative contact therewith.

Disposed between the plates 18 and 19 is a rubber or the like hydraulic tube 33 arranged to receive a hydraulic fluid under pressure to expand and thus to urge the brake linings 29 and 30 into frictional engagement with the friction plates 19 and 18, respectively. The outer ends of the plates 18 and 19 are overlapped over the outer periphery of the hydraulic tube 33 for resisting outward stress thereof upon being subjected to internal hydraulic pressure. For collapsing the hydraulic tube 33 and drawing the brake linings 29 and 30 away from the friction plates 19 and 18 as the brake is rendered inoperative, there are provided a plurality of circumferentially spaced spring clips 36 which are sprung over the ends of the plates 27 and 28 and disposed in appropriate recesses therein as shown.

Hydraulic fluid under pressure for expanding the hydraulic tube 33 to apply the brake is conducted from any suitable hydraulic fluid pressure generating apparatus not shown, by a tube 37 to a duct 38 in the hub 1. The duct 38 communicates with a cavity 39 in the hub 1 which opens into a tapped bore 40 in which is threaded a fitting 41 having a central bore 42 therein. The tapped bore 40 is in a portion 41 of the boss 24 provided without splines. Slidably positioned in the bore 42 is one end of a stem 43, the opposite end of which is vulcanized to an integral neck 44 of the hydraulic tube 33. Disposed about the stem 43 is a gland nut 45 threaded into the outer end of the fitting 41 and bearing against rubber or the like packing 46 for providing a seal between the fitting 41 and the stem 43. A sealing gasket 48 is provided between the fitting 41 and a seat 49 on the portion 47 of the annular boss 24. An opening 50 is provided in the ring 22 for receiving the fitting 41 and its gland nut 45 and the stem 43 passes through a radial bore 51 extending in the ring 22 outwardly from the opening 50, all as shown in Fig. 2.

The body sections 6 and 7 of the wheel have provided between them and the hub 1 conventional grease seals 52, and the sections 6 and 7 are maintained on the hub 1 by a ring 53 threaded to the outer end 54 of the hub 1, and bearing against the inner race of the bearing 5.

In the operation of the form of the invention disclosed in Figs. 1 and 2, hydraulic fluid under pressure through the tube 37 and duct 36 passes through the stem 43 into the hydraulic tube 33. The hydraulic fluid under pressure expands the hydraulic tube 33, urging the brake linings 29 and 30 outwardly into frictional engagement with the friction plates 19 and 18, respectively. Since the brake member 21, which includes the linings 29 and 30, is splined to the hub 1, and the friction plates 19 and 18 rotate with the wheel, the hub being stationary, the frictional engagement between the linings 29 and 30 and the friction plates 19 and 18, brakes the rotation of the wheel. The splined connection between the brake member 21 and the hub 1 permits the brake member 21 to float axially of the hub to compensate for any variations in axial alignment of the brake member 21 with respect to the wheel. Such variations in axial alignment may arise from such causes as tolerances in manufacture and wear of the linings 29 and 30. While the stem 43 is rigidly secured to the hub 1, it will be observed that the outer end thereof is vulcanized in the resilient neck 44 of the hydraulic tube 33. Thus, any tendency to axial floating of the brake member 21 will not be prevented by the stem 43 since both the neck 44 and the stem 43 will yield to permit axial floating.

As the brakes are applied there will be a tendency of the friction plates 18 and 19 to rotate relatively to the plates 15 and 16 of the wheel sections 6 and 7, respectively. This tendency to rotate is restrained, not only by the securing screws 17, but also by the wheel section connecting bolts 16, which pass through recesses 20 in the friction plates 18 and 19.

Another form of the invention is disclosed in Figs. 3 and 4. In this form of the invention, the essential difference resides in the fact that there are two sets of brakes instead of one, as shown in Fig. 1, and there is provided reinforcing structure between the sets of brakes.

Referring particularly to Figs. 3 and 4, a hub 55 is suported on an axle 56, and secured thereon by a nut 57. The wheel rim consists of sections 58, 59 and 60, sections 58 and 60 being outer sections and section 59 being an intermediate section. Sections 58 and 60 are provided with radially inwardly extending webs 61 and 62, respectively, which are supported from the hub 55 by bearings 63 and 64, respectively. The webs 61 and 62 are reinforced by webs 72 extending radially outwardly and parallel to the axis of the hub 55. Associated with the bearings 63 and 64 are the usual grease seals 65. Extending through the webs 61 and 62 and through radially inwardly and axially extending bosses 66 of the rim section 59 are a plurality of circumferentially spaced clamping bolts 67 for clamping the three sections, 58, 59 and 60, together to provide a unitary wheel. The unitary wheel is maintained on the hub 55 by a ring 68 threaded on the outer end 69 of the hub 55 and bearing against the inner race of the bearing 64.

The webs 61 and 62 have annular, friction plates 75, respectively, secured thereto by circumferentially spaced screws 76. Axially inwardly spaced from the friction plates 75 are inner, annular, friction plates 77 secured to the rim section 59 by circumferentially spaced screws 78. The friction plates 77 are provided with axially inwardly extending cylindrical portions 79 which abut at 80. The plates 77 and the cylindrical sections 79 are reinforced by a plurality of circumferentially spaced gussets 81. The friction plates 77 and cylindrical sections 79 units are made of cast iron whereas the balance of the wheel structural members are made of a light weight alloy of a higher coefficient of expansion than cast iron, so that when the friction plates 77 become heated in operation and expand, these plates together with their cylindrical sections 79, will expand less per unit rise of heat than the balance of the wheel and thus have a less tendency to exert a strain on the wheel. Also, the cylindrical sections 79 abutting at 80 will reinforce the friction plates 77 as an axial thrust is placed against them during the operation of the brakes.

Between each set of friction plates 75 and 77 there is disposed a brake member 82, which corresponds to the brake member 21 disclosed in Fig. 1. As shown, each brake member 82 has an annular shoulder 83 splined to an annular boss 84 on the hub 55. Each annular boss 84 has a portion thereon from which the splines are omitted and into which a bored fitting 85 is threaded to communicate with a duct 86 in the hub, which in turn communicates with a tube 87 for connection to a suitable hydraulic fluid pressure generating apparatus. As shown particularly in Fig. 4, there is a separate duct 86 in the hub 55 for each brake member 82, the ducts 86 being angularly spaced about 30 degrees. The provision of separate ducts for each brake member 82 permits individual operation of each brake as a safety feature.

The annular shoulders 83 are parts of annular rings 90, to which are clamped plates 91 by bolts 92. Brake linings 93 and 94 are secured to the plates 91 and held thereby in position for movement into frictional contact with the friction plates 75 and 77, respectively. Disposed between the plates 91 are tubular rubber or the like hydraulic tubes 95, each of which has communication with its duct 86 through a stem 96 connected in sealing relation to its fitting 85 by the gland nut 97 and packing 98, in the same manner as the corresponding structure disclosed in Figs. 1 and 2.

For retracting the brake linings 93 and 94 from the friction plates 75 and 77 when the brakes are released, there are provided a plurality of circumferentially spaced spring clips 99 bearing against the outer sides of the outer ends of the plates 91. In the form of the invention disclosed in Fig. 3, an alternative method of restraining the outward bulging of the hydraulic tubes 95 is provided. Instead of overlapping the ends of the brake lining supporting plates 91 over the ends of the hydraulic tubes 95, as shown in Fig. 1, the hydraulic tubes 95 each has about the periphery thereof a restraining band or strap 100.

In the operation of the form of the invention disclosed in Fig. 3, hydraulic fluid under pressure is directed through the stems 96 to the hydraulic tubes 95 to expand the same to urge the brake linings 93 and 94 into frictional contact with the friction plates 75 and 77, respectively. The brake members 82 will float axially by virtue of the splined connections between the annular shoulders 83 and the annular bosses 84, the same as the corresponding construction in Fig. 1. Also, the friction plates 75 and 77 are restrained against relative rotation with respect to the wheel by the clamping bolts 67 which pass through circumferentially spaced recesses 101 in the outer edges of the friction plates 75 and 77, in the same manner as the corresponding structure in Fig. 1.

In the form of the invention disclosed in Figs. 3 and 4, as above pointed out, the cylindrical sections 79, integral with the friction plates 77, serve to reinforce the friction plates 77 against inward deflection and yet due to the fact that they are made of cast iron do not expand an undesirably great amount with respect to the rest of the wheel due to the heat generated during braking. In the above forms of the invention, the reinforcing webs 11 and 12 of Fig. 1 and 72 of Fig. 3 are closely associated with the brake structure and therefore help to dissipate the heat generated.

Having thus described my invention, what I desire to secure by Letters Patent and claim is:

1. In a wheel of the character described, a hub, a body supported by said hub, bearings between said hub and said body, a pair of annular axially spaced brake friction members supported by said body, a unitary brake supporting part having a splined connection with said hub, brake members connected at their inner ends to said part and extending radially into operative relation with and between said friction members, and means to actuate said brake members, whereby said splined connection permits the brake members and part to axially float between said friction members as a unit.

2. In a wheel of the character described, a hub, a body supported by said hub, bearing means between said hub and said body, a pair of annular axially spaced friction members supported by said body, an annular brake member having a splined connection with said hub, said brake member extending radially into operative relation with and between said friction members, hydraulic means to actuate said brake member, a hydraulic connection carried by said hub having communication with said hydraulic means and having clearance with said splined connection, a flexible connection between said hydraulic connection and said brake element, whereby said splined and flexible connections permit said brake member to axially float between said friction members.

3. In a wheel of the character described, a hub, a multiple section body supported by said hub, bearing means between said hub and said body, a pair of annular axially spaced brake friction members supported by said body, bolts for securing said body sections together, portions of said bolts intersecting said friction members, slots extending inwardly from the periphery of said friction members in which said bolts are received to anchor said friction members against relative rotation with respect to said body, an annular brake member connected to said hub and extending radially into operative relation with and between said friction members, and means to actuate said brake member.

4. A vehicle wheel comprising a central hub, a pair of annular axially spaced flanges extending radially from said hub, bearings between said flanges and said hub, rim portions supported by the outer portions of said flanges, said rim portions being spaced, a central rim portion, means securing all of said rim portions together to provide a rim, a pair of radially inwardly extending annular brake friction members, means supporting said friction members from at least one of said rim portions, a pair of annular brake friction members secured to the outer portion of said flanges, one friction member of each of said pairs being adjacent one another and separated, an annular brake member extending radially into operative relation with and between each of said adjacent friction members, a connection between said brake members and said hub, and reinforcing rings extending axially inwardly from each of said first named friction members of one of said pairs, said rings abutting one another.

5. The invention as defined in claim 4 wherein the connections between the brake members and the hub are splined.

6. The invention as defined in claim 4 wherein the means securing said rim portions together is in operative relation with said friction members for anchoring said friction members against relative rotation with respect to the rim.

7. The invention as defined in claim 4 wherein the inner friction members and the respective axially extending reinforcing rings are respectively integral and are constructed from material having a lower coefficient of expansion than that of the rim and radially extending flanges.

8. In a wheel of the character described, a hub, a multiple section body supported by said hub, bearing means between said hub and said body, a pair of annular, axially spaced brake friction members supported by said body, means for securing said body sections together, an operative connection between said securing means and said friction members to anchor said friction members against relative rotation with respect to said body, an annular brake member splined to said hub and extending radially into operative relation with and between said friction members, and means to actuate said brake member, whereby said splined connection permits said brake member to axially float between said friction members.

9. In a wheel of the character described, a hub, a multiple section body supported by said hub, bearing means between said hub and said body, a pair of annular, axially spaced brake friction members supported by said body, axially extending, circumferentially spaced bolts for securing said body sections together, an operative connection between said bolts and said friction members to anchor said friction members against relative rotation with respect to said body, an annular brake member splined to said hub and extending radially into operative relation with and between said friction members, and means to actuate said brake member, whereby said splined connection permits said brake member to axially float between said friction members.

10. In a wheel of the character described, a hub, a body supported by said hub, bearings between said body and said hub, a pair of annular axially spaced friction brake members supported by said body, an annular brake member having a splined floating connection with said hub, said brake member extending radially into operative relation with and between said friction members, a hydraulic expandable tube for actuating said brake member, a fluid conducting member connected to said hydraulic tube, a conduit for hydraulic fluid in said hub, and a connection between said member and said conduit located in the plane of said splined connection and having clearance with said brake connection.

11. A wheel and brake assembly comprising a wheel body, including axially spaced structural surfaces, spaced brake rotor parts supported by said surfaces, a brake stator part disposed between said rotor parts, said stator part having a rigid hub portion and a pair of spaced flexible outer portions, a fixed wheel part, and an axially slidable connection between said wheel part and said brake rotor hub portion, whereby said brake stator part as a unit is floated between said brake rotor parts.

12. A wheel and interior brake assembly comprising a wheel body having exterior structural parts of one material, a brake housed by said exterior parts, and an interior structural housing wheel part of another material of a lower coefficient of expansion, said exterior and interior wheel parts being subjected to high braking temperatures generated by said brake.

13. A wheel and interior brake assembly comprising a wheel body having exterior structural parts, a pair of brakes housed by said exterior parts and axially spaced therein, and interior structural wheel parts disposed between said brakes, said interior structural parts being of a different material than said exterior parts and having a lower coefficient of expansion.

CHARLES HOLLERITH.